US008763120B1

(12) United States Patent  
Forristal

(10) Patent No.: US 8,763,120 B1  
(45) Date of Patent: Jun. 24, 2014

(54) EXPLOITATION DETECTION

(75) Inventor: Jeff Forristal, Elizabethton, TN (US)

(73) Assignee: Zscaler, Inc., San Jose, CA (US)

( * ) Notice: Subject to any disclaimer, the term of this patent is extended or adjusted under 35 U.S.C. 154(b) by 1093 days.

(21) Appl. No.: 12/173,060

(22) Filed: Jul. 15, 2008

(51) Int. Cl.  
*G06F 21/00* (2013.01)

(52) U.S. Cl.  
USPC .............................................. 726/23; 726/26

(58) Field of Classification Search  
CPC ............ G06F 2221/2119; G06F 21/55; G06F 21/128; G06F 21/577; G06F 21/56; G06F 21/00; G06F 11/3438; G06F 21/606; H04L 67/02  
See application file for complete search history.

(56) References Cited

U.S. PATENT DOCUMENTS

| 7,343,626 | B1 * | 3/2008 | Gallagher | 726/25 |
| 2005/0021791 | A1 * | 1/2005 | Sakiyama et al. | 709/229 |
| 2008/0034424 | A1 * | 2/2008 | Overcash et al. | 726/22 |
| 2008/0263650 | A1 * | 10/2008 | Kerschbaum | 726/9 |

OTHER PUBLICATIONS

Burns. Cross Site Reference Forgery, An introduction to a common web application weakness [on-line]. Information Security Partners LLC. 2005, (9 pages). [Retrieved on Jun. 18, 2008]. Retrieved from the Internet: <http://www.isecpartners.com>.

"Cross-site request forgery." Wikipedia, the free encyclopedia [online]. (3 pages). [Retrieved on Jun. 18, 2008]. Retrieved from the Internet: <http://en.wikipedia.org/wiki/Csrf>.

* cited by examiner

*Primary Examiner* — Michael S McNally  
*Assistant Examiner* — Carlton Johnson  
(74) *Attorney, Agent, or Firm* — Clements Bernard PLLC; Lawrence A. Baratta, Jr.; Christopher L. Bernard

(57) ABSTRACT

Systems, methods and apparatus for detecting malicious requests. In one aspect, a browser request is received from a client device. It is determined whether the request includes tracer data in a first parameter type. If the request is determined to include the tracer data in the first parameter type, then the request is allowed. If the request is determined to include the tracer data in a parameter type other than the first parameter type, then a security process is initiated.

20 Claims, 6 Drawing Sheets

EXPLOITATION DETECTION

BACKGROUND

Cross-site scripting ("XSS") is a form of cyber attack involving a filtering vulnerability on a web site; such vulnerability allows an attacker to perform scripting operations on a web browser. Often, those scripting operations are meant to hijack the web browser, typically by recovering the user's stored cookie values or causing the browser to directly access URLs to perform actions upon the web site.

One common avenue of exploiting XSS vulnerability is to cause the user to execute a script code, e.g., a JavaScript code that will collect the user's cookie values and send them to a remote server. An attacker will generally accomplish this by social engineering techniques, e.g., enticing the user into clicking on a URL on a web page, instant message, or HTML based email message that, unbeknownst to the user, causes the browser to execute the script. Once the user unknowingly executes the attacker's script, data from the user's machine is then forwarded to a server controlled by the attacker. When this occurs, the process of sending the values to the remote server is typically done via appending the user's cookie values as query parameters to a dynamically generated GET request.

SUMMARY

In general, one aspect of the subject matter described in this specification can be embodied in methods that include the receiving a browser request from a client device; determining whether the request includes tracer data; if the request includes the tracer data, then determining if the tracer data is included in a first parameter type; if the request is determined to include the tracer data in the first parameter type, then allowing the request; and if the request is determined to include the tracer data in a parameter type other than the first parameter type, then initiating a security process.

In another general aspect of the subject matter described in this specification, the embodied methods and systems can include receiving a browser request from a client device, the browser request related to a resource location; generating tracer cookie data for a tracer cookie related to the resource location, the tracer cookie data including tracer data; transmitting the tracer cookie data to a browser on the client device; monitoring data transmitted from the browser; determining if the tracer data is included in a subsequent request transmitted from a browser; if the tracer data is included in a subsequent request, determining if the tracer data is not included in a HTTP cookie header request; and if the tracer data is not included in a HTTP cookie header request, enforcing a security policy if the browser transmits the tracer cookie.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
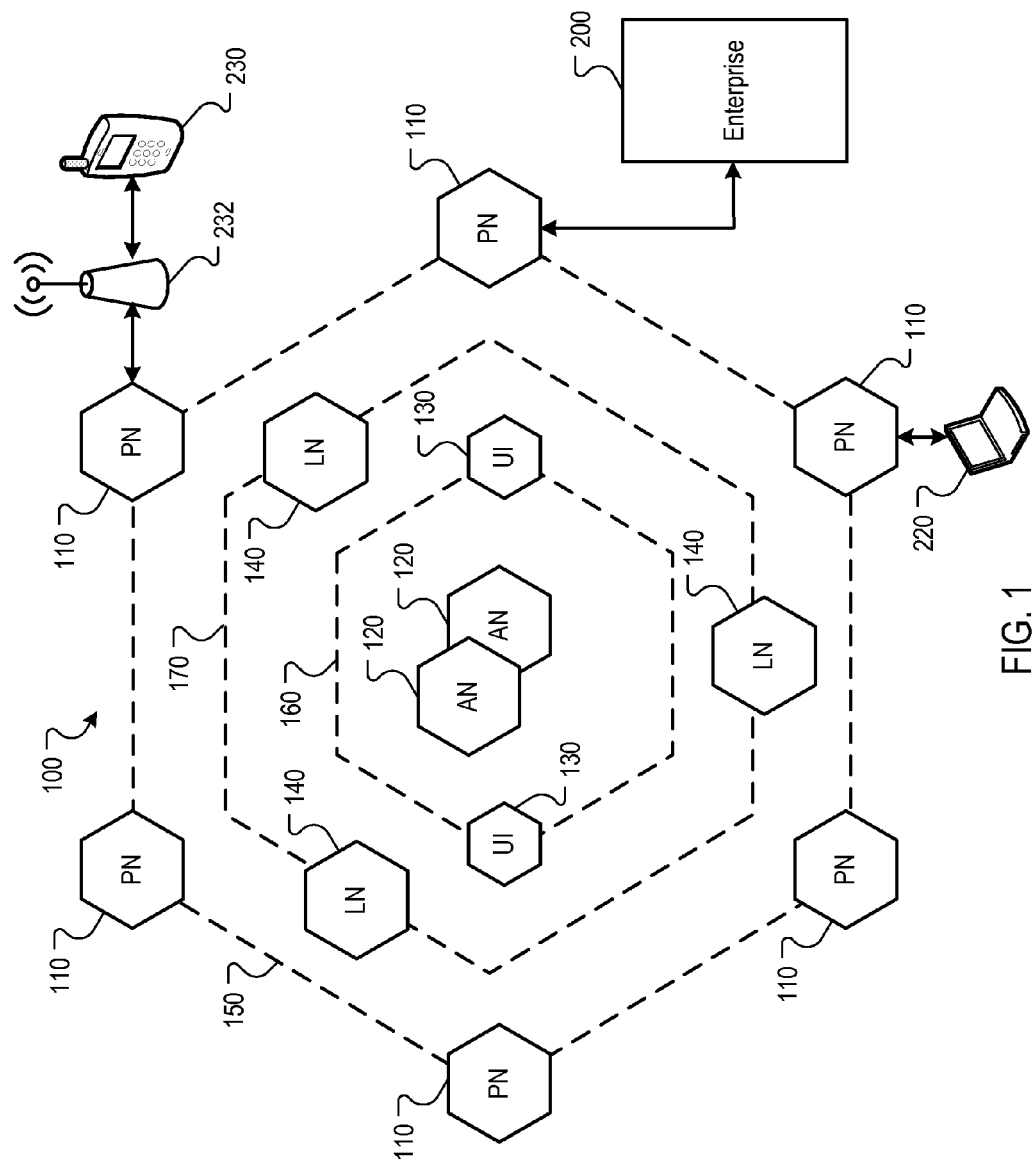
FIG. 1 is a block diagram of a distributed security system.

FIG. 1 is a block diagram of a distributed security system 100. The system 100 can, for example, be implemented as an overlay network in a wide area network (WAN), such as the Internet. The system 100 includes content processing nodes 110 that detect and preclude the distribution of security threats, e.g., malware, spyware, and other undesirable content sent from or requested by an external system. Example external systems can include an enterprise 200, a computer device 220, and a mobile device 230, or other network and computing systems.

§1.0 Example High Level System Architecture

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is process through a processing node 110.

Each processing node 110 can generate a decision vector $D=[d1, d2, \ldots, dn]$ for a content item of one or more parts $C=[c1, c2, \ldots, cm]$. Each decision vector can identify a threat classification, e.g., clean, spyware, malware, undesirable content, innocuous, unknown, etc. For example, the output of each element of the decision vector D can be based on the output of one or more data inspection engines. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

In some implementations, the processing nodes 110 can monitor network traffic to detect exploitation attacks. For example, each processing node 110 can monitor data received from a browser for the computer device 220, the mobile device 230, or other network and computing systems. The processing node 110 can also generate tracer data related to data being received from a resource location. For example, the resource location can be a web hosting server for example.com. Example.com sends data to a user device to display its content in the user's browser. Upon certain actions, a website such as example.com may send an HTTP cookie. In some implementations, the processing node 110 receiving data from example.com may generate tracer data each time example.com sends data. In other implementations, the processing node 110 can generate tracer data only once for the resource location.

Tracer data can be generated and stored in various formats, including a string value. The tracer data can be stored as a tracer cookie. For example, the tracer data could be the string "_sc_detect=987654321," which is unlikely to be repeated in cookies provided by resource locations. In some implementations, the tracer data can be unique for every instance of a browser request. For example, the tracer data can comprise a name value pair, such as for an HTTP cookie. In some implementations, the domain name can be included in the name value pair, such as an HTTP cookie. If a user visits Example Bank's website, examplebank.com, a tracer cookie can be generated, associating examplebank.com with the tracer cookie. In some implementations, the tracer data can be in the name portion of the name value pair, the value portion of the name value pair, or both the name and the value portions of the name value pair. For example, if the name of the cookie includes "examplebank.com/160019885,"tracer data can be added so that the name includes: "examplebank.com/160019885_sc_detect=987654321." Alternatively, the name of the name value pair can be the tracer data, or the tracer data can be the value of the name value pair. In some implementations, the tracer data can be in both the name and the value of the name value pair, so that "_sc_detect=987654321" is repeated. Similarly, the tracer data can be split between the name and value of the name value pair, e.g., "_sc_detect=" in the name portion and "987654321" in the value portion of the name value pair.

Monitoring requests from the user client device, the processing node 110 can determine whether the request includes tracer data. Often, when a user device sends a request, e.g., and HTTP request, to a resource location, the user device will include cookie data for that resource location in an HTTP cookie header. However, during an exploitation attack, a surreptitious script may attempt to send cookie data associated with a resource location(s) to another resource location, i.e., an exploit server. As the HTTP request generated from the surreptitious script will be directed to the exploit server, the cookie data from other resource locations will not be included in the HTTP cookie header. Accordingly, one technique to provide the cookie data of other resource locations to the exploit server is to provide the cookie data as a query parameter.

Thus, in some implementations, the processing node 110 allows a request including data only if the tracer data is included in the expected data location. For example, if the tracer data is included in the expected data location, and the expected data location is an HTTP cookie, then it is likely normal web browser behavior sending all cookies to a remote destination. The processing node 110 can determine if the tracer data is included in a data location other than the expected data location. For example, if the tracer data is included in an HTTP reference header, it is likely that malicious code is attempting to send the user's cookie values to a remote destination, such as an exploitation server, in an inappropriate manner. Likewise, if the tracer data is part of JavaScript or ActiveX communication data, it is likely that there is an attempt to send the user's cookie values in an inappropriate manner, as requests for cookie data from the originating websites are typically requested as HTTP cookie headers. If the processing node 110 determines that the tracer data is in a parameter type different than a first parameter type, e.g. an HTTP cookie header, the processing node 110 can initiate a security process, such as sending a warning to the user, blocking the source of the malicious code, or denying the browser request.

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communication to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority nodes 120 can distribute the policy data to the access nodes 110.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data, threat data, and data inspection engines and dictionaries for the processing nodes.

Other application layer functions can also be provided in the application layer, such as a user interface front-end 130. The user interface front-end 130 provides a user interface through which users of the external systems can provide and define security policies, e.g., whether e-mail traffic is to be monitored, whether certain web sites are to be precluded, etc.

Another application capability that can be provided through the user interface front-end 130 is security analysis and log reporting. The underlying data on which the security analysis and log reporting functions operate are stored in logging nodes 140, which serve as a data logging layer 170. Each logging node 140 can store data related to security operations and network traffic processed by the processing nodes 110 for each external system.

In some implementations, the processing node 110 may act as a forward proxy that receives user requests to external servers addressed directly to the processing node 110. In other implementations, the processing node 110 may access user requests that are passed through processing node 110 in the transparent mode. A protected system, e.g., enterprise 200, can, for example, choose one or both of these modes.

§2.0 Example Detailed System Architecture and Operation

Figure 2:
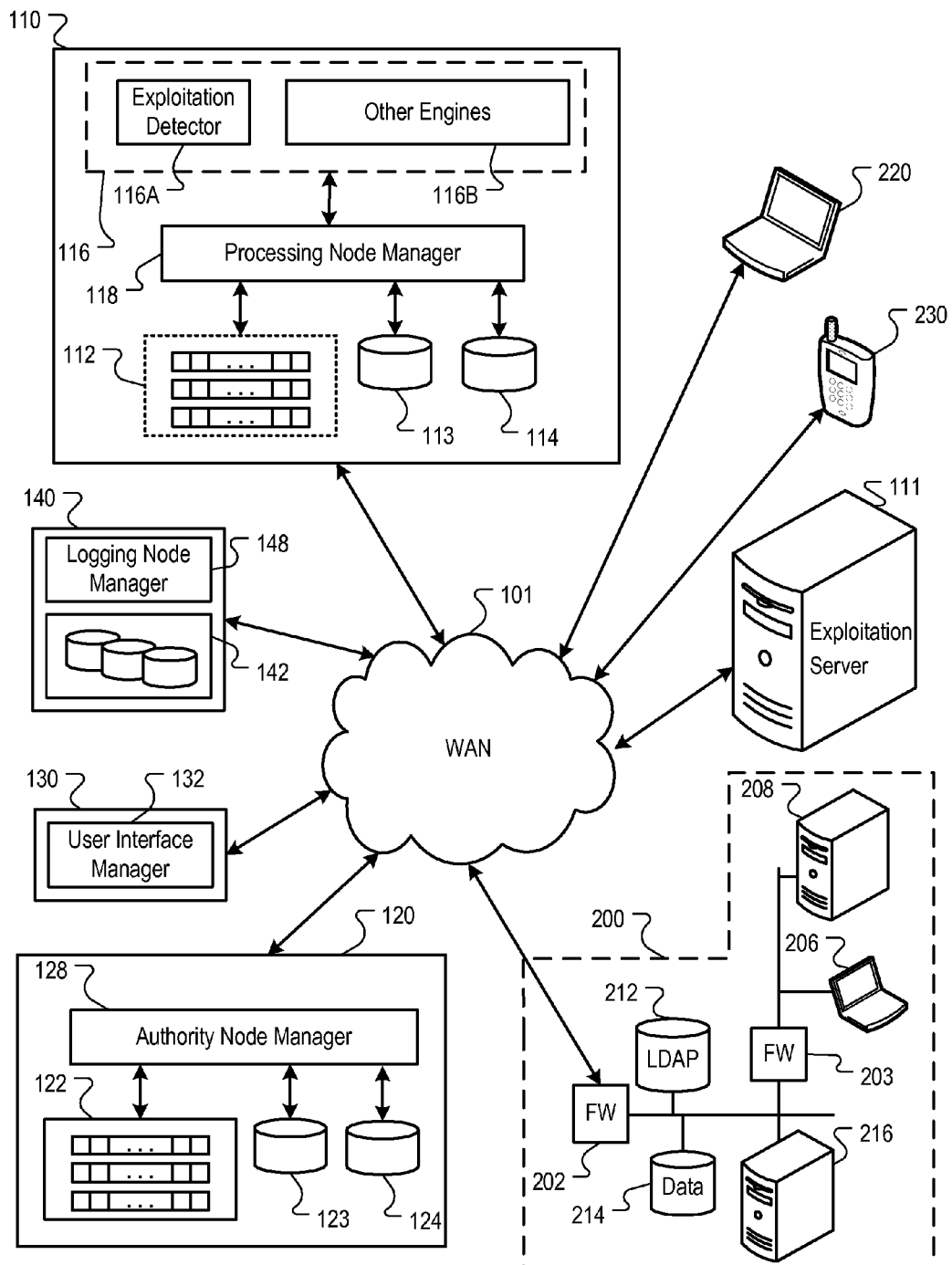
FIG. 2 is a block diagram of the system of FIG. 1 in which the components of FIG. 1 are illustrated in more detail.

FIG. 2 is a block diagram of the system of FIG. 1 in which the components of FIG. 1 are illustrated in more detail. Although only one representative component processing node 110, authority node 120 and logging node 140 are illustrated, there can be many of each of the component nodes 110, 120 and 140 present in the system 100.

A wide area network (WAN) 101, such as the Internet, or some other combination of wired and/or wireless networks, connects in data communication the processing node 110, authority node 120 and logging node 140. The external systems 200, 220 and 230 likewise communicate over the WAN 101 with each other or other data providers and publishers. Some or all of the data communication of each of the external systems 200, 220 and 230 can be processed through the processing node 110. An exploitation server 111 is also depicted as communicating through the WAN 101. The exploitation server 111 can exists as a network of servers, or there can be multiple exploitation servers 111 attempting to improperly obtain a user device's cookies.

FIG. 2 also shows the enterprise 200 in more detail. The enterprise 200 can, for example, include a firewall 202 protecting an internal network that can include one or more enterprise servers 206, a lightweight director access protocol (LDAP) server 212, and other data or data stores 214. Another firewall 203 can protect an enterprise subnet that can include user computers 206 and 208 (e.g., laptop and desktop computers). The enterprise 200 may communicate with the WAN 101 through one or more network devices, such as a router, gateway, etc. The LDAP server 104 may store, for example, user login credentials for registered users of the enterprise 200 system. Such credentials can include a user identifiers, login passwords, and a login history associated with each user identifier. The other data 214 can include sensitive information, such as bank records, medical records, trade secret information, or any other information warranting protection by one or more security measures.

The computer device 220 and the mobile device 230 can also store information warranting security measures, such as personal bank records, medical information, and login information, e.g., login information to the server 206 of the enterprise 200, or to some other secured data provider server.

§2.1 Example Processing Node Architecture

In some implementations, the processing nodes 110 are external to network edges of the external systems 200, 220 and 230. Each processing node 110 stores security policies 113 received from the authority node 120 and monitors content items requested by or sent from the external systems 200, 220 and 230. In some implementations, each processing node 110 can also store a detection process filter 112 and/or threat data 114 to facilitate the decision of whether a content item should be processed for threat detection.

A processing node manager 118 can manage each content item in accordance with the security policy data 113, and the detection process filter 112 and/or threat data 114, if stored at the processing node 110, so that security policies for a plurality of external systems in data communication with the processing node are implemented external to the network edges for each of the external systems 200, 220 and 230.

The processing node 110 can include data inspection engines 116. Each data inspection engine 116 can be configured to perform a threat detection process to initiate security processes and/or classify content items according to a threat classification for a corresponding threat. For example, the data inspection engines can include an exploitation detector 116A that can monitor browser requests for tracer data. Other engines may be used, as shown in Other Engines 116B. Such engines can include a network URL filter to classify a URL address as allowed or restricted, a data leakage protection (DLP) engine to identify a content item as secure or leaking, or a dynamic content categorization (DCC) engine to classify a content item as passed or failed.

The list of the data inspection engines is illustrative only; many other data inspection engines 116 can also be used, as can multiple instances of data inspection engines, e.g., different type data leakage engines implementing different data leakage algorithms. The calling of any particular data inspection engine 116 can be predicated on the type of content item to be threat detected.

§2.2 Example Authority Node Architecture

In general, the authority node 120 includes a data store that stores master security policy data 123 for each of the external systems 200, 220 and 230. An authority node manager 128 can be used to manage the master security policy data 123, e.g., receive input from users of each of the external systems defining different security policies, and can distribute the master security policy data 123 to each of the processing nodes 110. The processing nodes 110 then store a local copy of the security policy data 113.

The authority node 120 can also store a master detection process filter 122. The detection processing filter 122 can include data indicating whether content items have been processed by one or more of the data inspection engines 116 in any of the processing nodes 110. The authority node manager 128 can be used to manage the master detection processing filter 122, e.g., receive updates from a processing nodes 110 when a processing node 110 has processed a content item and update the master detection processing filter 122. In some implementations, the master detection processing filter 122 can be distributed to the processing nodes 110, which then store a local copy of the detection processing filter 112.

The authority node 120 can also store master threat data 124. The master threat data 124 can classify content items by threat classifications, e.g., a list of known viruses, a list of known malware sites, spam e-mail domains, etc. The authority node manager 128 can be used to manage the master threat data 124, e.g., receive updates from a processing nodes 110 when a processing node 110 has processed a content item and update the master threat data 124 with any pertinent results. In some implementations, the master threat data 124 can be distributed to the processing nodes 110, which then store a local copy of the threat data 114.

§2.3 Example Processing Node and Authority Node Communications

The processing node 110 and the authority node 120 can be configured according to one or more push and pull processes to manage content items according to security policy data 113 and/or 123, detection process filters 112 and/or 122, and the threat data 114 and/or 124.

§3.0 Example Tracer Data Generation And Detection Timing Diagrams

Figure 3A:
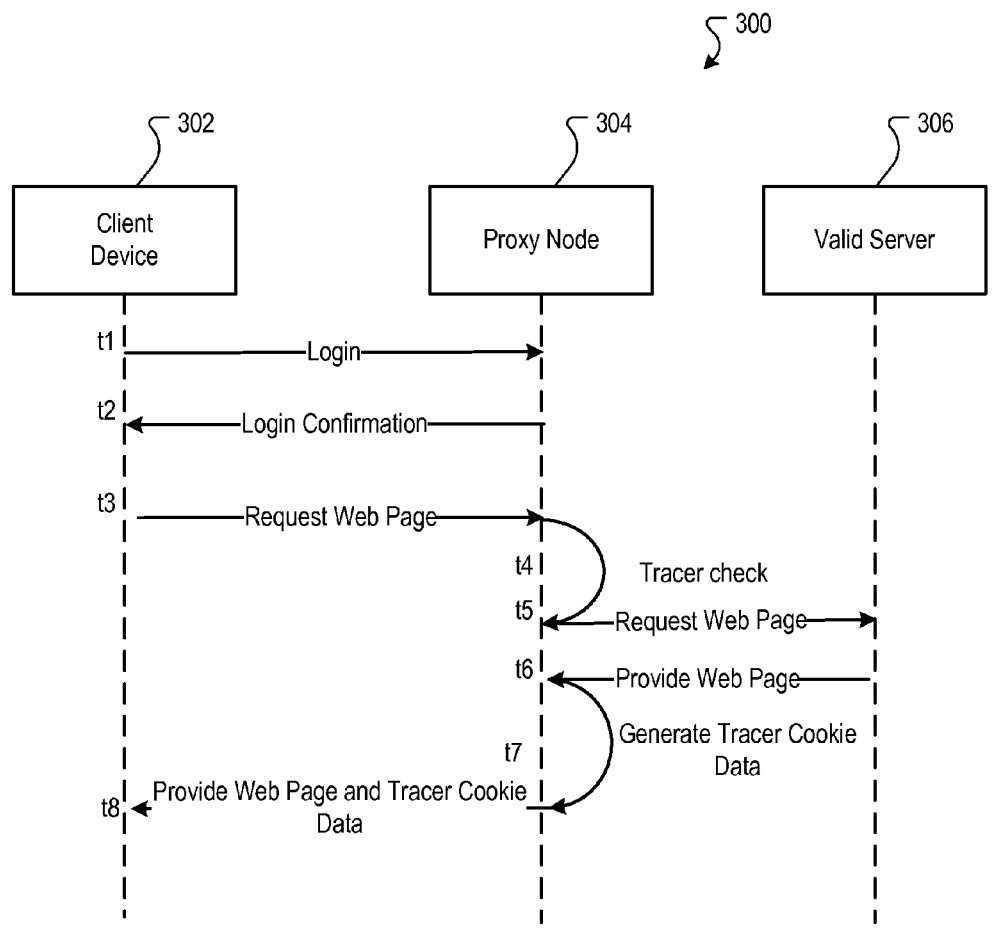
FIG. 3A is a timing diagram of detecting and generating tracer data in a browser request.

FIG. 3A is a timing diagram 300 of detecting and generating tracer data in a browser request. The timing diagram 300 includes a client device 302, a proxy node 304, and a valid server 306. The client device 302 can be a personal computer, a mobile device, or other user device. The proxy node 304 can be a device that exists as part of the distributed security system 100 of FIG. 1. Alternatively, the proxy node 304 can be a part of the client device 302, realized as a software agent, or implemented in a firewall external to the client 302 and interposed between the client 302 and a communication network. The valid server 306 can be a single server for a website or a plurality of devices separate from the client device.

FIG. 3A illustrates the generation and tracer data. At a high level, the proxy node 304 receives a browser request from the client device 302 and checks for tracer data. If tracer data is not included in the request, then the proxy node 304 can forward the request to a valid server 306 and, in response to receiving data from the valid server 306, generate tracer cookie data. The proxy node 304 can then send the tracer cookie data along with data from the valid server 306 to the client device 302. More specific steps are described below.

At time t1, the client device 302 transmits login information to the proxy node 304. The proxy node 304 can process the login information and send a login confirmation to the client device 302 at time t2. At time t3, the client device 302 transmits a request for a web page to the proxy node 304, and the proxy node 304 can performs a tracer check at time t4. Once the tracer check t4 is complete, and no tracer data is found, the proxy node 304 transmits the request for a web page to the valid server 306 at time t5. The valid server 306, in response, provides web page data to the proxy node 304 at time t6. Once the proxy node 304 has received the web page data from the valid server 306, the proxy node 304 generates the tracer cookie data at time t7. In some implementations, the tracer cookie data can be generated using the same naming convention as the cookie data of the valid server 306. At time t8, the proxy node 304 sends the tracer cookie data with the web page data from the valid server 306. Thereafter, all subsequent requests from the client device 302 to the valid server will include the tracer data in the HTTP cookie header.

In some implementations, a single instance of tracer data, e.g., a single tracer cookie, is associated with a location, e.g., a domain. In other implementations, multiple instances of tracer cookies can be associated with a location. An example implementation is described with respect to FIG. 3B.

Figure 3B:
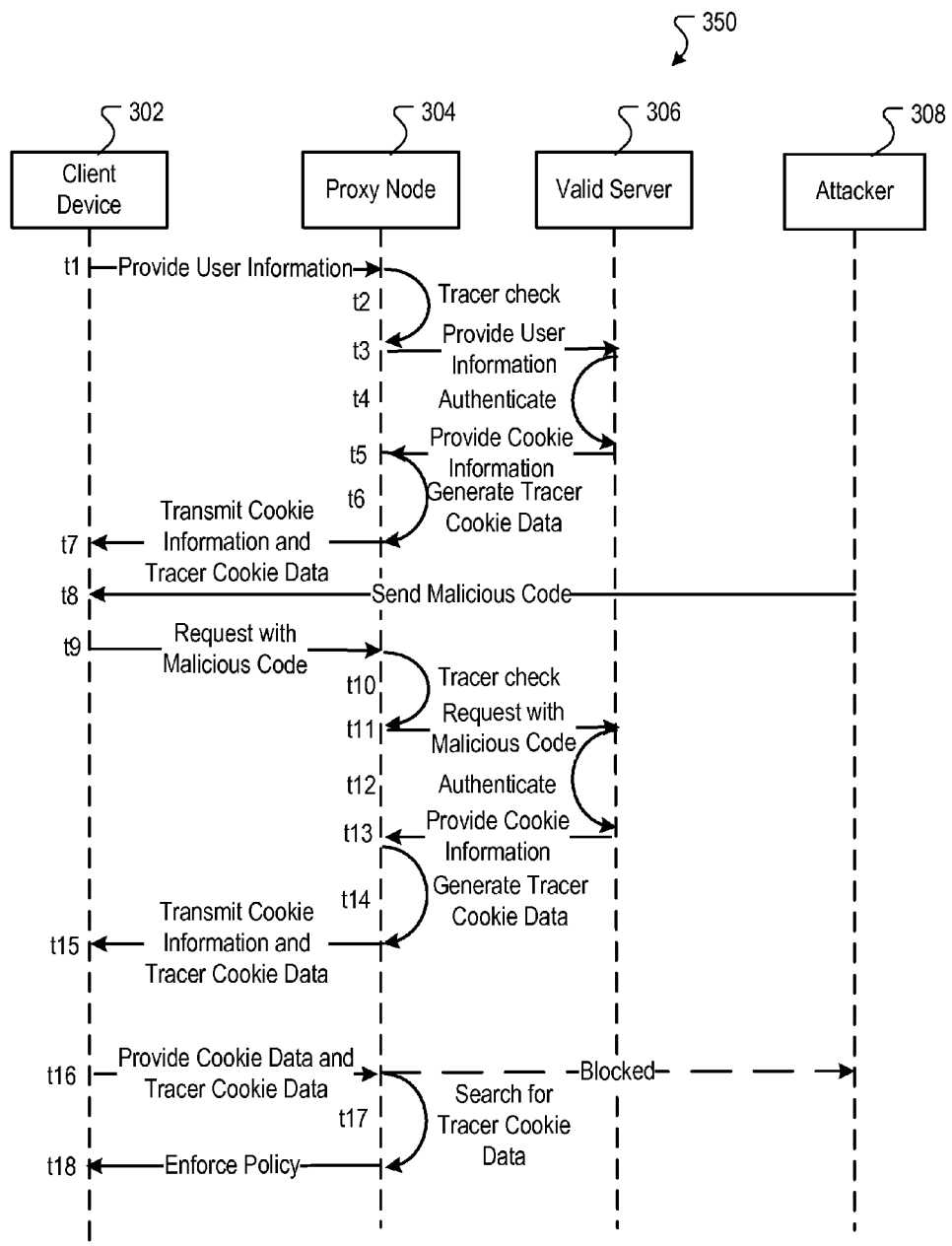
FIG. 3B is a timing diagram of generating and detecting tracer data.

FIG. 3B is a timing diagram 350 of generating and detecting tracer data. In some implementations, FIG. 3B can be a continuation of the timing diagram 300 of FIG. 3A. The timing diagram 300 includes a client device 302, a proxy node 304, a valid server 306, and an attacker 308. The attacker 308 can be a single web server or a plurality of computing devices, typically set up to send malicious code to a client device 302 and retrieve user data in an inappropriate manner.

At a high level, FIG. 3B describes the processing of a request with tracer data from the client device 302 to the proxy node 304, and also describes the sending of data from the client device to an attacker 308 in a cross site scripting attack. For the processing of the request of the valid server 306, the proxy node 304 receives user information intended for the valid server 306 from the client device 302 and checks for tracer data. Provided the tracer data is provided as a first parameter type, e.g., an HTTP cookie header, the proxy node 306 removes the tracer data and sends the request to the valid server. The valid server 306 uses the user information to generate additional cookie data. The proxy node 304 receives the additional cookie data and web data from the valid server 306 and generates additional tracer cookie data, and then sends the tracer cookie data along with cookie data and web data from the valid server 306 to the client device 302.

When the client device 302 receives a malicious piece of code in a communication from the attacker 308, such as a link in a web page, an e-mail, or an instant message, the client device 302 can send a request, e.g. by clicking on the link and sending the malicious code to the valid server 306. From this point, the proxy node 304 sees the request as an allowed request, and similar steps are followed as described above. The malicious code attempts to retrieve all cookies for the valid server 306, however, and the proxy node 304 detects the tracer cookie in the data sent by the client device 302. Upon detecting the tracer cookie, the proxy node 304 blocks any transfer of data to the attacker 308 and initiates a security policy. More specific steps are described below.

At time t1, the client device 302 transmits user information to the proxy node 304. Included in the request as an HTTP cookie header is the tracer data generated by the process of FIG. 3A. The proxy node 304 performs a tracer check at time t2, and the request is determined to be allowable. Once the tracer check at the time t2 is complete, the proxy node 304 transmits the user information, e.g., banking account number and password, to the valid server 306, e.g., examplebank.com, at time t3. The valid server 306 can authenticate the user information at time t4 and provide additional cookie data related to the user information, as well as web page data to the proxy node 304 at time t5.

Once the proxy node 304 has received the web page data and the additional cookie data from the valid server 306, the proxy node 304 generates additional tracer cookie data at time t6. At time t7, the proxy node 304 sends the additional tracer cookie data with the web page data and the cookie data from the valid server 306 to the client device 302.

At time t8, the attacker 308 sends malicious code embedded in a message received by the client device 302, e.g., a fraudulent e-mail that requests credit card information or bank information, and the like (although shown as occurring at time t8, the attacker can send the malicious code at other times as well). For example, the malicious code can be embedded in e-mail message that resembles a banking statement from examplebank.com. If the user clicks on a link in the e-mail message, a request can be sent from the client device 302 to the proxy node 304 at time t9. At time t10, a tracer check will allow the request, and the proxy node 304 will transmit the request to the valid server 306 at t11. At t12, the valid server 306 will authenticate the client device 302 and provide cookie information to the proxy node 304 at t13. The proxy node 304 can generate tracer cookie data at t14 and transmit the cookie information and tracer cookie data to the client device 302 at t15.

The malicious code can then cause a second request for the client device 302 to send all cookie data, as part of the request and not in the HTTP cookie header, to the attacker 308. This request can be received by the proxy node 304 at t16. At t17, the proxy node 304 detects the tracer cookie data outside the HTTP cookie header and enforces security policies at t18. As shown, the cookie data is never sent to the attacker 308.

In some implementations, the proxy node may only search for tracer cookie data that is not in a particular parameter type. For example, if the particular parameter type is an HTTP cookie header, and the tracer data is stored in HTTP cookie format, the proxy node 304 may only search JavaScript code or a reference header for tracer cookie data.

§4.0 Example Processes

Figure 4A:
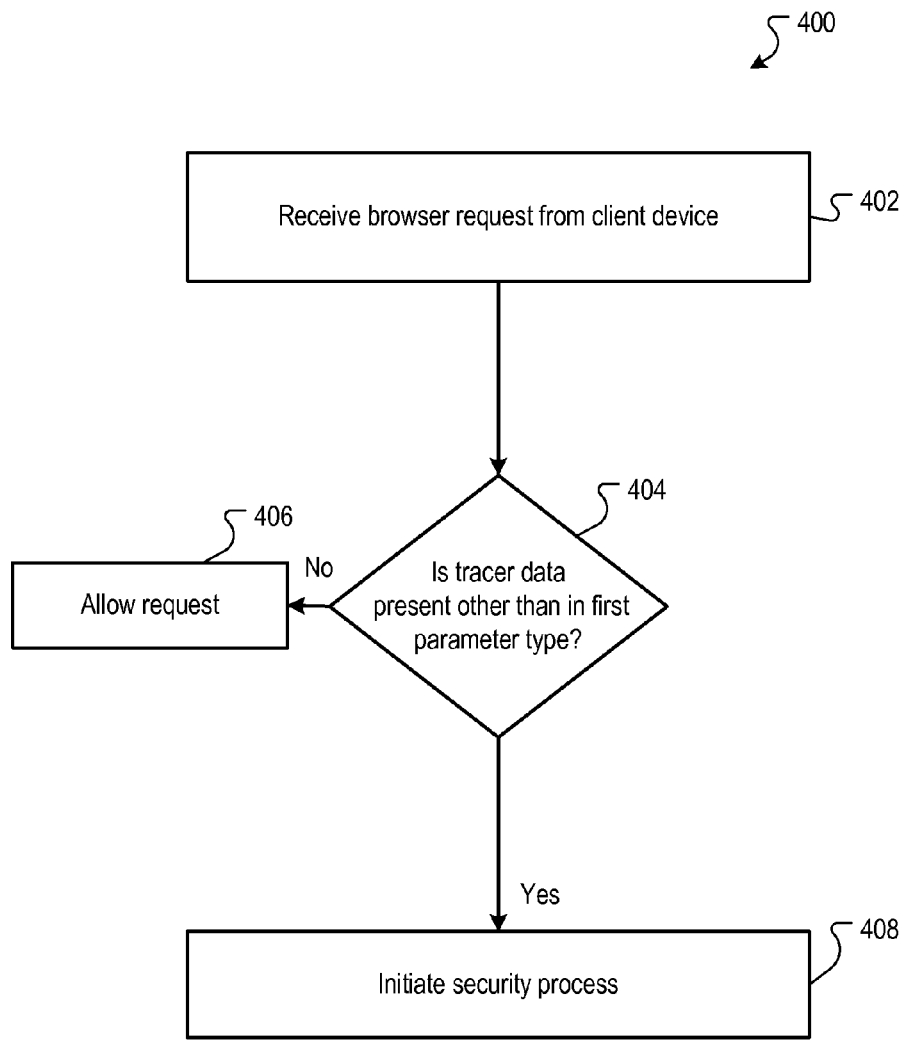
FIG. 4A is a flow diagram of an example process for detecting tracer data in a browser request

FIG. 4A is a flow diagram of an example process for detecting tracer data in a browser request. The process 400 can, for example, be used in the security system 200 in FIG. 2.

The process 400 receives a browser request from a client device (402). For example, the mobile device 230, or other client device can transmit a browser request to a processing node 110.

The process 400 determines whether the browser request includes tracer data in a first parameter type (404). For example, the exploitation detector 116A can determine if the tracer data is included in the first parameter type. If the tracer data is included in a first parameter type, the process 400 can allow the browser request (406). For example, if the exploitation detector 116A determines that the tracer data is only included in a HTTP cookie, the exploitation detector 116A can allow the processing node 110 to transmit the browser request to a wide area network 101.

If the tracer data is present in the browser request other than in the first parameter type, the process 400 can initiate a security process (408). For example, if exploitation detector 116A determines that the tracer data is part of some ActiveX communication data, or passed as a query parameter, the processing node 110 can transmit a warning to the client device 230.

In some situations, the attacker 308 can also function as a valid server 306. For example, the client device 302 can receive data from the attacker 308 as a valid web site, and a tracer cookie is returned for that site. No malice has occurred. Later, the client device 302 is exploited and cookies are sent to attacker 308—in this case, the request to attacker 308 can have a tracer cookie, and also have tracer data in the query. In such instances, the process 500 can be implemented by ensuring that tracer data is not transmitted outside the first parameter type, whether or not that tracer data is in the first parameter type.

Figure 4B:
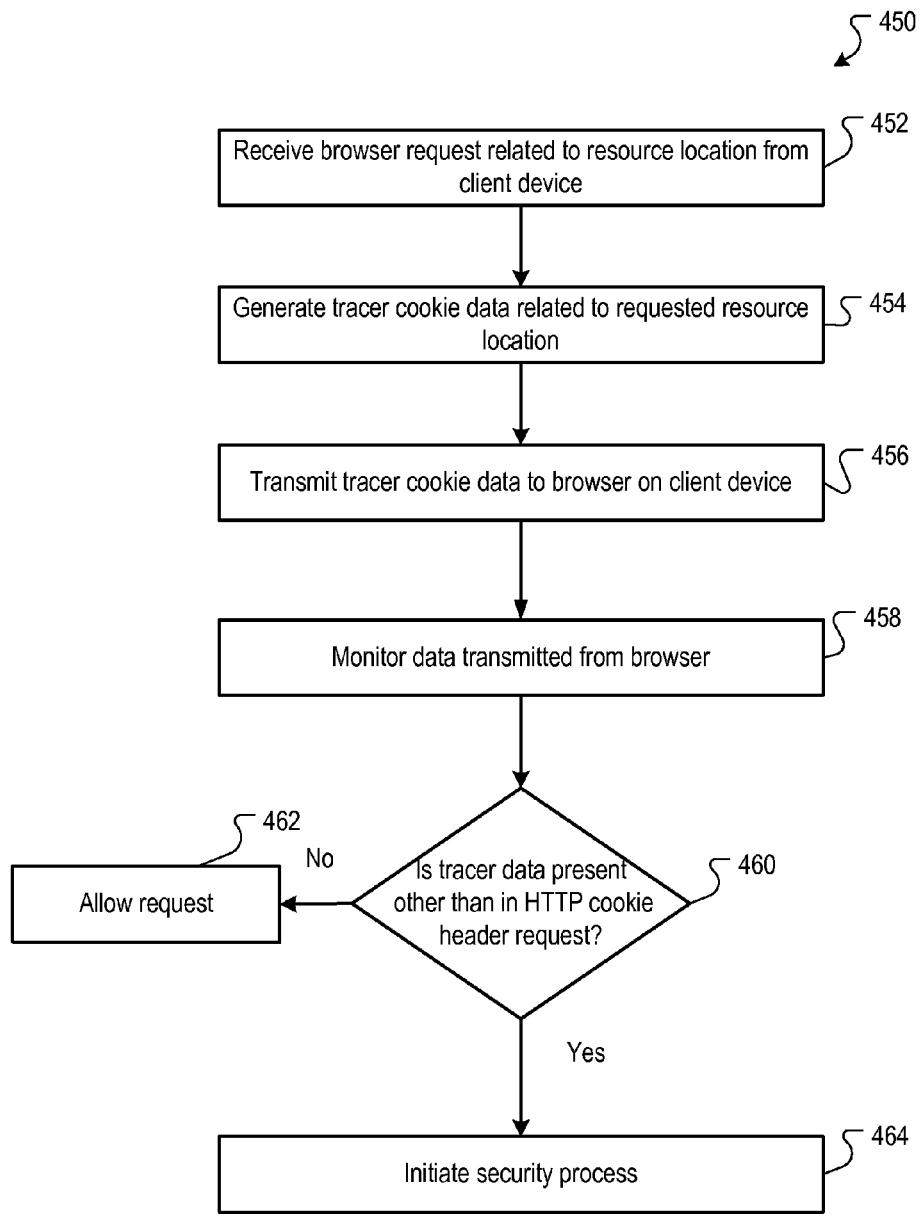
FIG. 4B is a flow diagram of an example process for generating and detecting tracer data.

FIG. 4B is a flow diagram of an example process for generating and detecting tracer data. The process 450 can, for example, be used in the security system 200 in FIG. 2.

The process 450 receives a browser request related to a resource location from a client device (452). For example, the client device 230 can transmit a browser request to the processing node 110.

The process 450 generates tracer cookie data related to the requested resource location (454). For example, the exploitation detector 116A can generate tracer cookie data related to the browser request from the client device 230.

The process 450 transmits tracer cookie data to a browser on the client device (456). For example, the processing node 110 can transmit the tracer cookie data to the mobile device 230.

The process 450 monitors data transmitted from the client device (458). For example, the processing node 110 can search for tracer cookie data included in requests from the client device 302.

The process 450 can determine whether tracer data is included in a HTTP cookie header request (460). For example, the exploitation detector 116A can determine if the tracer data is included in the HTTP cookie header request. If the tracer data is not included in the request outside the HTTP cookie header request, the process 450 can allow the request (462). For example, the processing node 110 can strip the tracer data from the request and forward the request to the destination server.

If the tracer data is included in the request outside of the HTTP cookie header request, the process 450 can initiate a security process (464). For example, the exploitation detector 116A can determine if the tracer data is included in a field other than the HTTP cookie header, e.g., included as a query parameter, or a reference header request. The exploitation detector 116A can then transmit a warning to the client device 230.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Likewise, the actions recited in the claims can be performed entirely in an enterprise system, for example, in a firewall 202, a single computer, or a gateway device.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer implemented method, comprising:
receiving a browser request from a client device;
determining whether the request includes tracer data in other than a first parameter type, wherein the tracer data is generated by a proxy node in a distributed security system based on data being received from a resource location associated with the browser request for detecting an exploitation attack, wherein the tracer data is generated subsequently from receiving the browser request by the proxy node based on a web page response from a valid server, and wherein the tracer data is not generated by the client device or the resource location associated with the browser request and is selected to be a string which is unlikely to be repeated in cookies provided by resource locations along with an associated domain name both combined in a name value pair of a cookie;
providing the tracer data to the client device from the proxy node; and
if the request is determined to include the tracer data in a parameter type other than the first parameter type, then initiating a security process by the distributed security system at the proxy node comprising sending a warning to the client device and one of blocking a source of the malicious code or denying the browser request.

2. The method of claim 1, further comprising:
determining whether the request includes tracer data;
if the request does not include the tracer data, then providing the tracer data to the client device for storage in the first parameter type.

3. The method of claim 2, wherein the first parameter type is a Hypertext Transfer Protocol (HTTP) cookie.

4. The method of claim 3, wherein the tracer data is included in a portion of one or more of the name or value of the name value pair of the HTTP cookie.

5. The method of claim 1, wherein the tracer data is a string value.

6. The method of claim 1, wherein the other parameter type is a reference header.

7. The method of claim 1, wherein the tracer data is unique to a user of the client device.

8. The method of claim 1, wherein the tracer data is unique for every instance of a browser request.

9. The method of claim 2, wherein:
the tracer data comprises a name value pair for a Hypertext Transfer Protocol (HTTP) cookie; and
the first parameter type is an HTTP cookie header; and
providing the tracer data to the client device for storage in the first parameter type comprises:
receiving HTTP cookie data in response to the browser request, the HTTP cookie data including cookie identification data;
generating the tracer data that includes the cookie identification data; and
providing the HTTP cookie data and the cookie identification data to the client device.

10. The method of claim 2, wherein the cookie identification data includes a domain name.

11. The method of claim 1, further comprising:
receiving the browser request in a node separate from the client device and part of a distributed security system; and
the node appending the tracer data to the request.

12. The method of claim 11, further comprising:
if the request is determined to not include the tracer data, then forwarding the request; and
if the request is determined to include the tracer data in an expected location, then forwarding the request;
wherein the security process is initiated if the node detects the tracer data in an unexpected location.

13. A computer implemented method of security, comprising:
receiving a browser request from a client device at a node in a distributed security system, the browser request related to a resource location;
generating tracer cookie data for a tracer cookie related to the resource location, the tracer cookie data including tracer data, wherein the tracer cookie data is generated in the node separately from the browser request based on a web page response from a valid server to the node, wherein the tracer cookie data is selected to be unlikely repeated in cookies provided by resource locations to enable detection of an exploitation attack by the distributed security system, wherein the tracer data is not generated by the client device or the resource location and is selected to be a string which is unlikely to be repeated in cookies provided by resource locations along with an associated domain name both combined in a name value pair of a cookie;
transmitting the tracer cookie data to a browser on the client device;
monitoring Hypertext Transfer Protocol (HTTP) requests transmitted from the browser;
for each HTTP request:
determining if the tracer data is present other than in an HTTP cookie header request; and
if the tracer data is present other than in the HTTP cookie header request, enforcing a security policy at the proxy node comprising sending a warning to the client device and one of blocking a source of the malicious code or denying the browser request.

14. The method of claim 13, wherein only one tracer cookie is generated for the resource location.

15. The method of claim 13, further comprising receiving data from the requested resource location, wherein the data includes a data cookie related to the requested resource location, the data cookie including cookie identification data, and wherein generating a tracer cookie related to the resource location, the tracer cookie including the cookie identification data.

16. The method of claim 15, wherein the cookie identification data includes a domain name.

17. The method of claim 15, wherein the data cookie includes user information.

18. The method of claim 13, wherein each resource location is related to a unique tracer cookie.

19. The method of claim 13, wherein the tracer data is a name value pair.

20. Software stored in a computer readable medium and comprising instructions executable by a processing node system in a distributed security system, and in response to such execution causes the processing node system to perform operations comprising:
  receiving a browser request from a client device, the browser request related to a resource location;
  generating tracer cookie data for a tracer cookie related to the resource location, the tracer cookie data including tracer data, wherein the tracer cookie data is generated in the processing node system separately from the browser request based on a web page response from a valid server to the processing node system, wherein the tracer cookie data is selected to be unlikely repeated in cookies provided by resource locations to enable detection of an exploitation attack by the distributed security system, wherein the tracer data is not generated by the client device or the resource location and is selected to be a string which is unlikely to be repeated in cookies provided by resource locations along with an associated domain name both combined in a name value pair of a cookie;
  transmitting the tracer cookie data to a browser on the client device;
  monitoring Hypertext Transfer Protocol (HTTP) requests transmitted from the browser;
  for each HTTP request:
    determining if the tracer data is present other than in an HTTP cookie header request; and
    if the tracer data is present other than in the HTTP cookie header request, enforcing a security policy at the proxy node comprising sending a warning to the client device and one of blocking a source of the malicious code or denying the browser request.

* * * * *